United States Patent [19]
Baxter et al.

[11] Patent Number: 5,206,845
[45] Date of Patent: Apr. 27, 1993

[54] MODULAR DATA STORAGE AND RETRIEVAL SYSTEM

[75] Inventors: C. Graham Baxter, Los Gatos; John W. Meadows, Los Altos Hills, both of Calif.

[73] Assignee: Document Imaging Systems Corporation, Sunnyvale, Calif.

[21] Appl. No.: 631,046

[22] Filed: Jun. 5, 1989

[51] Int. Cl.[5] .............................................. G11B 17/00
[52] U.S. Cl. ...................................... 369/34; 369/29; 369/36; 360/98.06
[58] Field of Search ................... 369/29, 30–34, 369/36, 38–39; 360/97.01, 97.03, 98.01, 98.02–98.04, 99.12, 98.08, 98.05–98.06

[56] References Cited

U.S. PATENT DOCUMENTS

| | | | |
|---|---|---|---|
| 4,504,936 | 3/1985 | Faber et al. | 369/34 |
| 4,527,262 | 7/1985 | Manto | 369/34 X |
| 4,608,679 | 8/1986 | Rudy et al. | 369/34 X |
| 4,754,397 | 6/1988 | Varaiya et al. | 369/34 X |
| 4,817,071 | 3/1989 | Carlson et al. | 369/34 X |

Primary Examiner—William M. Shoop, Jr.
Assistant Examiner—David Martin
Attorney, Agent, or Firm—Flehr, Hohbach, Test, Albritton & Herbert

[57] ABSTRACT

Modular data storage and retrieval system having data cells for holding a plurality of optical storage cartridges, drive cells for holding devices such as drives for transcribing data on the cartridges, and a back plate on which the cells can be mounted in any desired combination. Two types of mounting positions are provided, one for either data cells or drive cells, the other for data cells. Two or more sections of the system can be placed side-by-side, stacked and/or placed back-to-back to provide a larger system. Each section is provided with at least one picker for moving the cartridges between the cells in the section. In some embodiments, a single picker is provided for each section, and in other embodiments a separate picker is provided for each row of cells. The back plates have registration pins which engage sockets on the cells to assure accurate alignment of the cells on the plates. The cells are symmetrical with regard to the way they mount, and they can be oriented in two different positions, e.g. with the cartridges turned horizontally or vertically.

28 Claims, 5 Drawing Sheets

MODULAR DATA STORAGE AND RETRIEVAL SYSTEM

This invention pertains generally to information storage and retrieval and, more particularly, to a modular system for the storage and retrieval of data stored in an optically readable form.

Optical storage media can store substantially more data in a given amount of space than other forms of storage media such as magnetic disks and other magnetic media. A double sided 5¼ inch optical disk can, for example, store one gigabyte per side, or a total of 2 gigabytes, whereas a double sided magnetic disk typically stores only about one megabyte. Thus, one 5¼ inch optical disk can hold the data for about ten thousand 8½×11 inch pages with a resolution of 300 dots per inch, which is equivalent to about four drawers in a filing cabinet.

Optical disks were originally envisioned as a publishing medium for databases consisting primarily of text, but they have been found to be far more versatile than that. Hundreds of commercially prepared optical disks have been published in the United States, containing a wide variety of works, e.g. encyclopedias, scientific monographs, catalogs of books and old newsreels, collections of raw data, and the Official Airline Guide.

Heretofore, there have been some attempts to provide systems for handling libraries of optical storage media in order to retrieve the data stored thereon. Such systems are sometimes referred to as "juke boxes" because of their similarity to machines of that name for playing phonograph records. The automated systems heretofore provided for storing and retrieving optical disks have, however, been subject to certain limitations and disadvantages.

It is in general an object of the invention to provide a new and improved system for the storage and retrieval of data stored in an optically readable form.

Another object of the invention is to provide a system of the above character which overcomes the limitations and disadvantages of systems heretofore provided for the storage and retrieval of optical storage media.

Another object of the invention is to provide a system of the above character which is flexible and is readily configured to a system of desired size.

These and other objects are achieved in accordance with the invention by providing a modular system having data cells for holding a plurality of optical storage cartridges, drive cells for holding devices such as drives for transcribing data on the cartridges, and a back plate on which the cells can be mounted in any desired combination. Two types of mounting positions are provided, one for either data cells or drive cells, the other for data cells. Two or more sections of the system can be placed side-by-side, stacked and/or placed back-to-back to provide a larger system. Each section is provided with at least one picker for moving the cartridges between the cells in the section. In some embodiments, a single picker is provided for each section, and in other embodiments a separate picker is provided for each row of cells. The back plates have registration pins which engage sockets on the cells to assure accurate alignment of the cells on the plates. The cells are symmetrical with regard to the way they mount, and they can be oriented in two different positions, e.g. with the cartridges turned horizontally or vertically.

Figure 1:
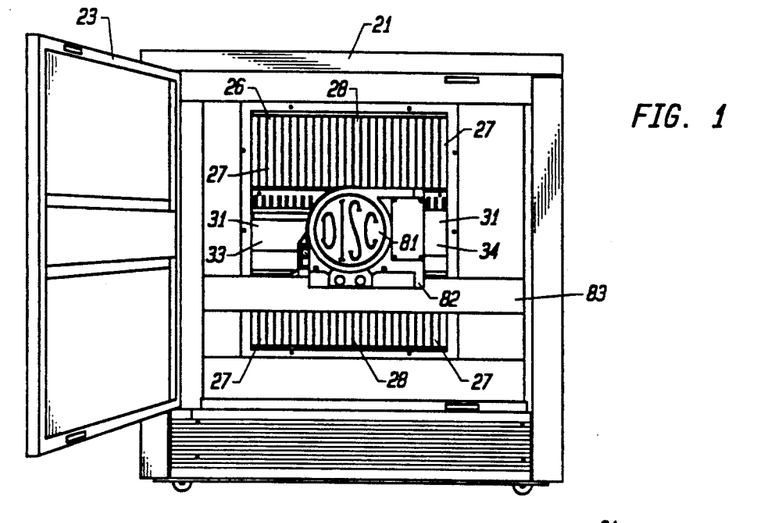
FIG. 1 is a side elevational view of one embodiment of a data storage and retrieval system according to the invention.
Figures 2, 4, 5:
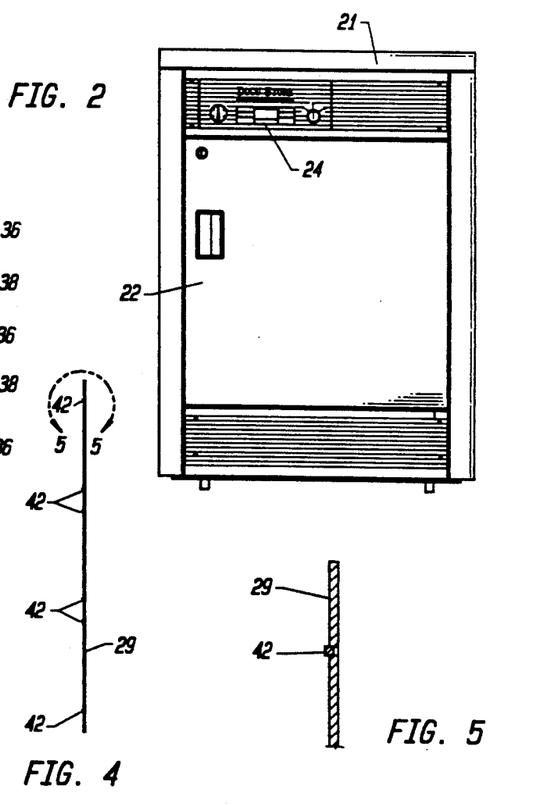
FIG. 2 is an end elevational view of the embodiment of FIG. 1.
FIG. 4 is a cross sectional view taken along line 4-4 in FIG. 3.
FIG. 5 is an enlarged view of the area designated by line 4—4 in FIG. 4.

The embodiment illustrated in FIGS. 1-2 has a generally rectangular cabinet 21 which is approximately the same size as a standard two-drawer file cabinet. Hinged doors 22,23 are provided at the front and sides of the cabinet, and a control panel 24 is provided toward the top of the front of the cabinet.

In this embodiment, and in the other embodiments disclosed herein, data is stored in optical disks mounted in generally rectangular cartridges 26. Each such cartridge contains a double sided disk which can hold up to 2 gigabytes of data. Each cartridge is approximately 6 inches square and ¼ inch thick.

The cartridges are stored in modular cells 27,28 which are mounted on a back plate 29 within the cabinet 21. Cells 27 hold ten cartridges each, and cells 28 hold five. The back plate stands vertically and is parallel to the sides of the cabinet. For convenience, the side of the plate on which the cells are mounted is referred to as the front of the plate although it faces the side of the cabinet. Optical drives for reading the data stored on the cartridges are mounted in a second type of modular cell 31 which is also mounted on back plate 27. In addition to optical drives, cells 31 can also hold other devices such as mass storage, Winchester drives, WORM drives, floppy disk drives, magnetic tape drives, and rolled microfilm. The particular embodiment shown in FIG. 1 has four full size data cells 27, two half size data cells 28, and two drive cells 31. An optical drive 33 is mounted in one of the drive cells, and a Winchester drive 34 is mounted in the other. This embodiment had an additional half size module (not shown) which is used for alignment purposes. Since the system is modular, it is quite flexible, and it can be configured with any desired combination of data cells, drives, and other devices.

Figure 3:
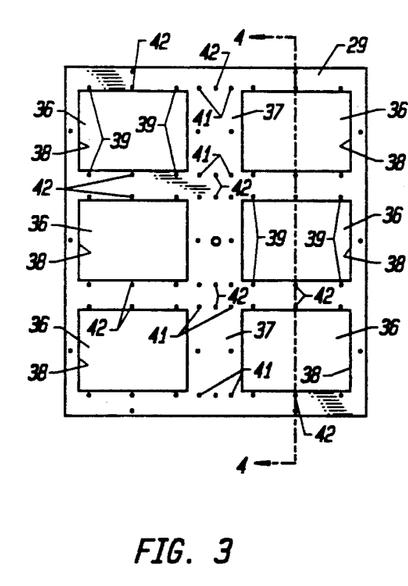
FIG. 3 is an elevational view of a back plate employed in the embodiment of FIG. 1.

As illustrated in FIGS. 3-5, back plate 29 is a rigid rectangular plate which can, for example, be a ¼ inch thick steel plate. It is important that the plate be rigid so that the cartridges, drives and other devices in the cells mounted thereon will remain in proper alignment. The cells are mounted on the front side of the plate and face toward the side of the cabinet as viewed in FIG. 2, with the fronts of cells being aligned generally in a plane.

Back plate 29 has six positions 36 in which either data cells or drive cells can be mounted and three positions 37 in which half size data cells can be mounted. An opening 38 is formed in the plate at each of the drive cell locations to permit devices such as drives which are deeper than the cells to extend through the plate. For convenience, positions which can hold either data cells or drive cells are sometimes referred to herein as drive cell positions, and positions which can hold only data cells are referred to as data cell positions.

The data cells and the drive cells are secured to the back plate by means of mounting screws 40, and every full size cell has its mounting screws arranged in a similar pattern to permit interchangeability among the cells. Thus, for each of the drive positions, the back plate has four mounting holes 39 arranged in a square pattern. As discussed more fully hereinafter, the square pattern provides a symmetry which permits full size data cells to be mounted with the cartridges oriented either horizontally or vertically. Each of the mounting positions for the half size cells has four mounting holes 41 arranged in a rectangular pattern.

A pair of registration pins 42 are provided for each of the mounting positions on the back plate to assure accurate alignment of the cells and the cartridges, drives and other devices carried thereby. The pins project from the front side of the back plate and are received in sockets on the back sides of the cells. The pins are located on the vertical center line of each mounting position. In the embodiment illustrated, the pins are formed by punching part way through the plate from the rear to form raised bosses or dowel pins on the front. All of the pins on the plate can be formed in a single punching operation, and this provides a high degree of accuracy in the location of the pins.

As illustrated in FIGS. 6-9, each of the full size data cells 27 has a rear wall 44, a top wall 46, a bottom wall 47, a pair of partitions 48 which extend between the top and bottom walls, and an open front 49. A plurality of ribs or guides 51 extend along the inner sides of the top, bottom and rear walls in a direction parallel to the partitions to define slots 52 for the cartridges. Generally trapezoidal cut-out areas 54 are provided in the front portions of the partitions to permit access to the cartridges in the slots adjacent to the partitions. In the embodiment illustrated, the full size cell has ten slots, but a greater or lesser number can be employed, if desired.

Means is provided for retaining the cartridges in the slots so that they will not be dislodged by vibration or other disturbances. This means comprises a resilient finger 56 formed in the top wall of the cell at the top of each slot. The fingers engage the upper edge portions of the cartridges and frictionally retain them in the slots. The data cells are molded of plastic as unitary structures, and the retaining fingers are an integral part of this structure.

Figure 6:
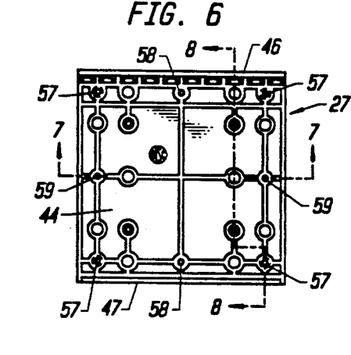
FIG. 6 is a rear elevational view of one embodiment of a cell for holding optical storage disks in the embodiment of FIG. 1.
Figure 7:
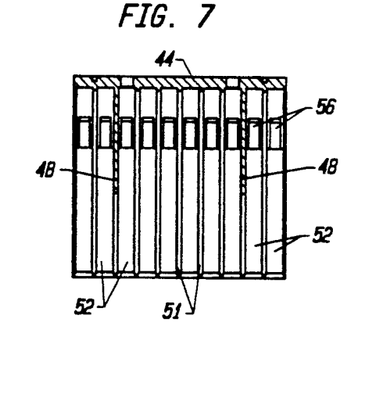
FIG. 7 is a cross sectional view taken along line 7—7 in FIG. 6.
Figure 8:
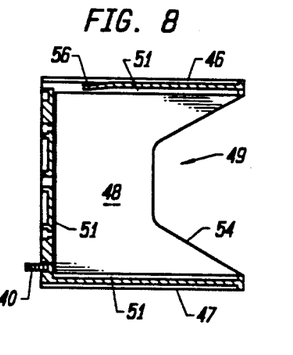
FIG. 8 is a cross sectional view taken along line 8—8 in FIG. 6.
Figure 9:
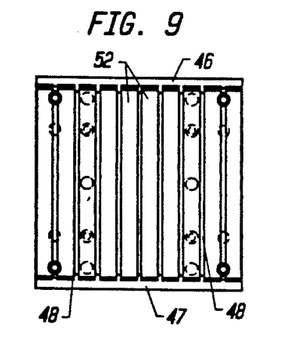
FIG. 9 is a front elevational of the cell of FIG. 6.

The rear wall 44 of the full size cell is square, and it has four mounting holes 57 arranged in the same square pattern as the mounting holes 39 in back plate 29. The cells are mounted on the back plate by screws 40 passing through these holes. The rear wall has a ribbed construction for strength and rigidity.

Two pairs of registration sockets 58,59 are also provided on the rear wall of the full size data cell. Sockets 58 are located on the vertical center line of the cell, and sockets 59 are located on the horizontal center line. The symmetry of the cell permits it to be mounted with the slots for the cartridges extending either vertically or horizontally. When the slots are vertical, the registration pins 42 on the back plate engage sockets 58, and when the slots are horizontal, the pins engage sockets 59.

Figure 10:
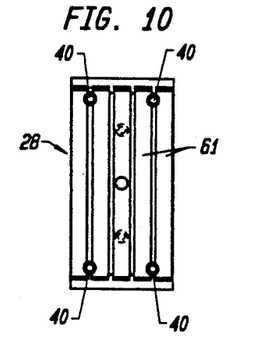
FIG. 10 is a front elevational view of another embodiment of a cell for holding optical storage disks in the embodiment of FIG. 1.
Figure 11:
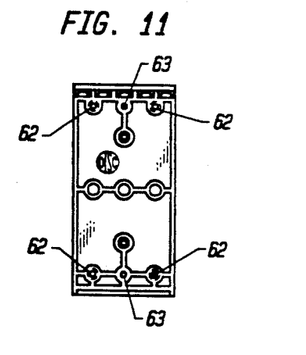
FIG. 11 is a rear elevational view of the cell of FIG. 10.

The half size data cell 28 illustrated in FIGS. 10-11 has the same height and depth as the full size cell, but has only five cartridge slots 61 and is only about half as wide. The mounting holes 62 in this cell are arranged in the same rectangular pattern as the mounting holes 41 in the back plate 29, and the cell is affixed to the plate by mounting screws passing through these holes. The half size cell has only one pair of registration sockets 63 which are located on the vertical center line of the cell. This cell is not symmetrical, and it can only be mounted in one orientation on the back plate, i.e. with the slots vertical. The half size cell is otherwise similar to the full size cell.

Figure 12:
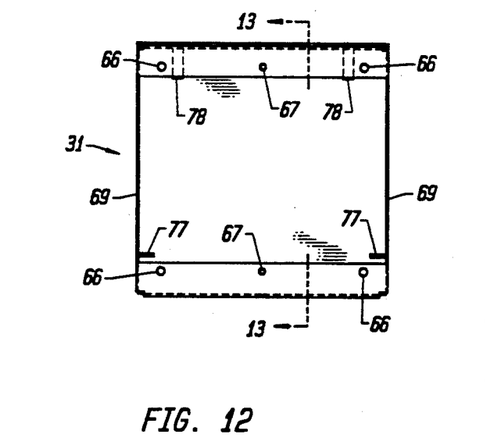
FIG. 12 is a rear elevational view of one embodiment of a cell for holding a device such as an optical drive or another storage device in the embodiment of FIG. 1.

The drive cell 31 has the same overall size and shape as the full size data cell, and it has four mounting holes 66 arranged in the same square pattern as the holes 39 in the back plate. The drive cell is mounted on the back plate by screws 40 which pass through these holes. The drive cell also has a pair of registration sockets 67 which receive the registration pins 42 to assure proper alignment of the cell on the back plate. These sockets are located on the vertical center line of the cell.

Figure 13:
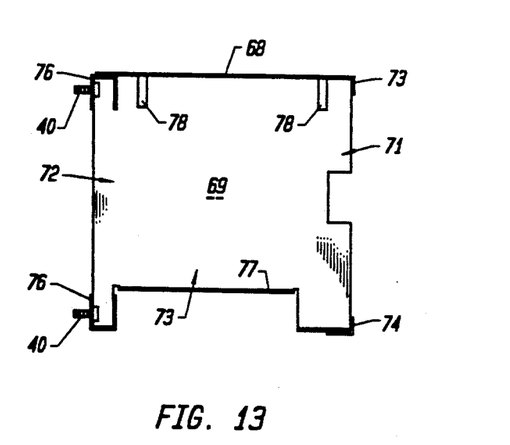
FIG. 13 is a cross sectional view taken along line 13-13 in FIG. 12.

As illustrated in FIGS. 12-13, the drive cell has a top wall 68 and side walls 69, and is open on the front 71, rear 72 and bottom 73. A flange 73 and an angle member 74 extend across the top and bottom of front opening 71, and channel members 76 extend across the top and bottom of rear opening 72. Mounting holes 67 and registration sockets 67 are formed in the rear flanges of channel members 76. Flanges 77 extend inwardly from side walls 69 to form rails for supporting a drive or other device mounted in the cell. Posts 78 extend in a downward direction from the top wall for supporting other devices in the cell.

The drive cell is formed as a rigid unitary structure, and in one presently preferred embodiment, it is fabricated of sheet metal and welded together.

Means is provided for transporting the cartridges between the cells, and in the embodiment of FIG. 1, this means comprises a picker 81 mounted on a carriage 82 which is mounted on a bridge 83. The bridge moves vertically to align the picker with the different rows of cells, and the carriage travels horizontally along the bridge to align the picker with the cartridges or drives in each row. The picker has a pair of arms which can be extended and retracted in a direction perpendicular to the back plate to move cartridges into and out of the data cells and the drives. The picker rotates on the carriage to move the cartridges between the vertical orientation of the data cells and the horizontal orientation of the drive. The bridge, the carriage and the picker can be driven by any suitable means which can be of conventional design and does not form a part of the invention.

Figure 14:
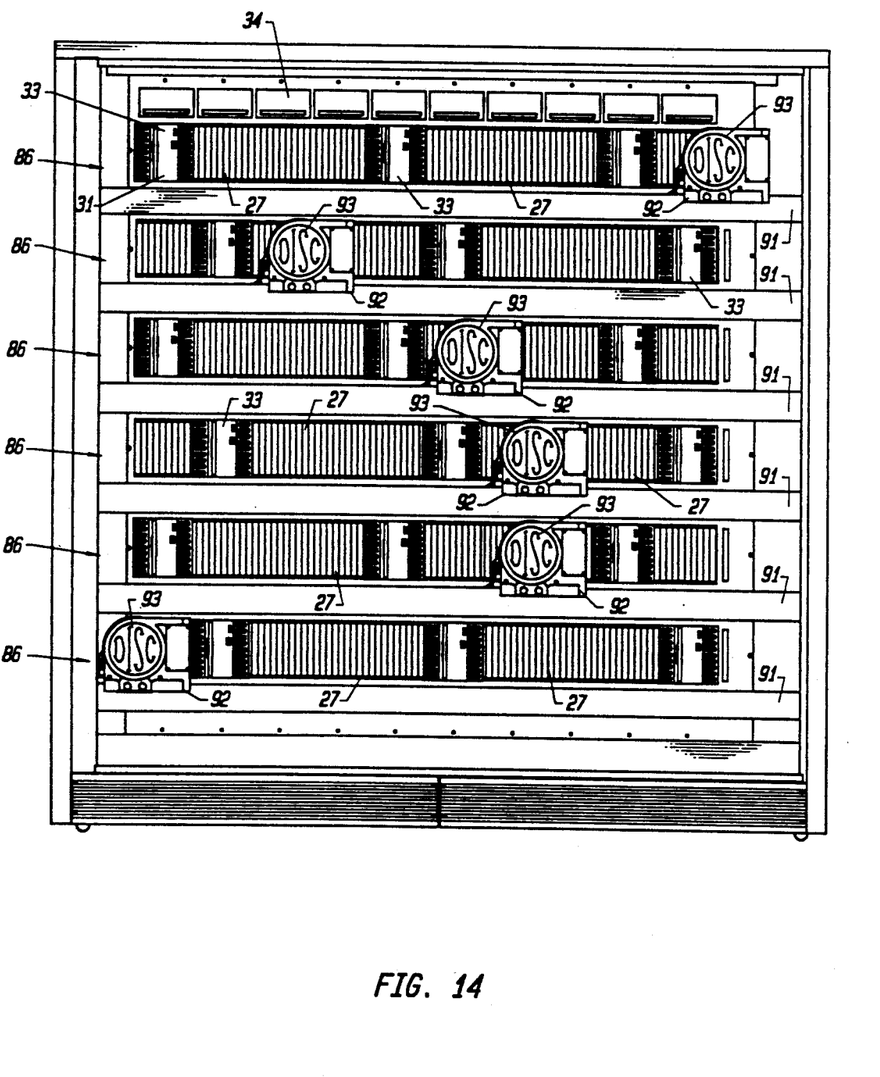
FIG. 14 is a side elevational view of another embodiment of a data storage and retrieval system according to the invention.

FIG. 14 illustrates another embodiment of the invention which has six rows of cells 86, with seven full size data cells 27 and three drive cells 31 in each row. Each of the drive cells has an optical drive 33 mounted therein. In addition, this embodiment also has an additional row 87 of Winchester drives 34 above the other rows. The data cells and drive cells utilized in this embodiment are identical to the cells in the embodiment of FIG. 1, and they are mounted in a similar manner on the back plate. The back plate in this embodiment is similar to the back plate in FIG. 3, with a different arrangement of mounting positions for the drive cells and data cells. In this embodiment the data cell positions and the drive cell positions are arranged in a checkboard pattern with data cell positions between the drive cell positions both horizontally and vertically.

In the embodiment of FIG. 14, a separate picker assembly is provided for each of the rows 86. Each of the picker assemblies comprises a stationary bridge 91, with a horizontally movable carriage 92 mounted on the bridge and a picker 93 mounted on the carriage. Each of the pickers is thus dedicated to one of the rows, and it moves the cartridges between the data cells and the drives in that row. This eliminates the need for a travelling bridge and provides faster access to a greater number of cartridges than a system having a single picker.

Figure 15:
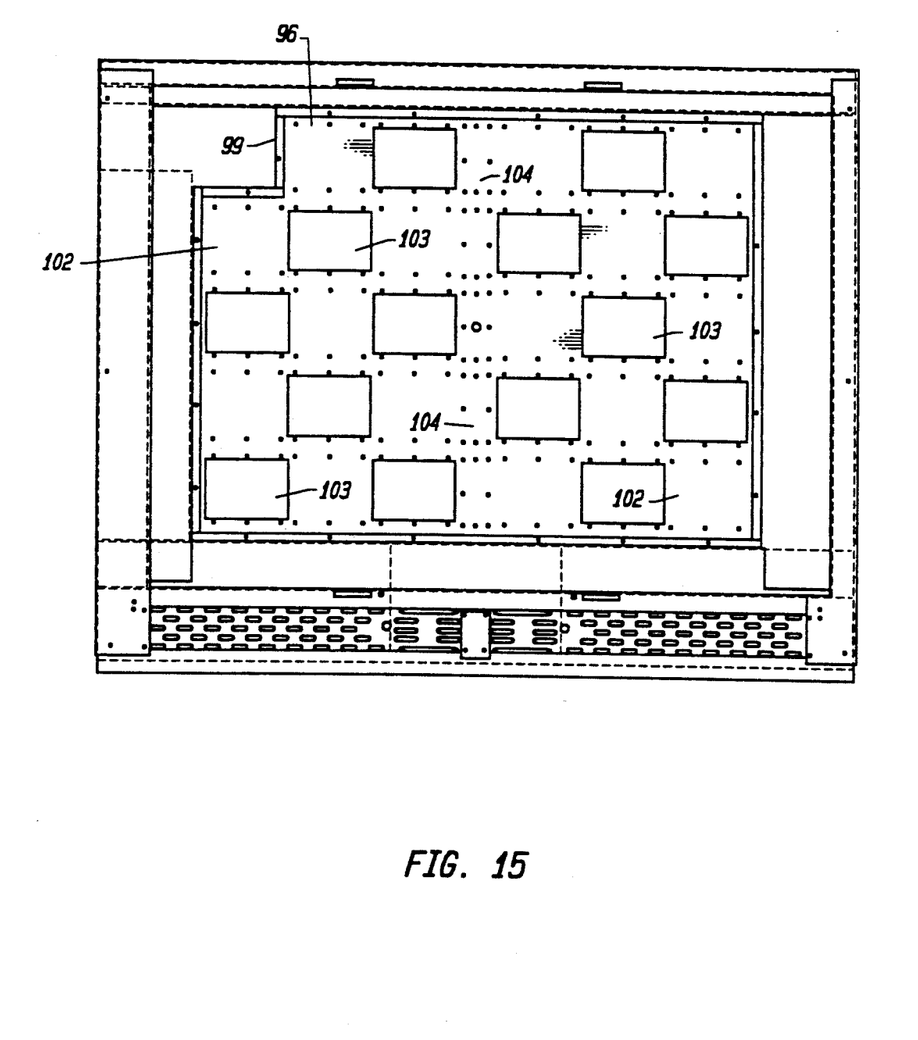
FIG. 15 is a right side elevational view illustrating one of the back plates in an embodiment of a data storage and retrieval system according to the invention with back-to-back plates.
Figure 16:
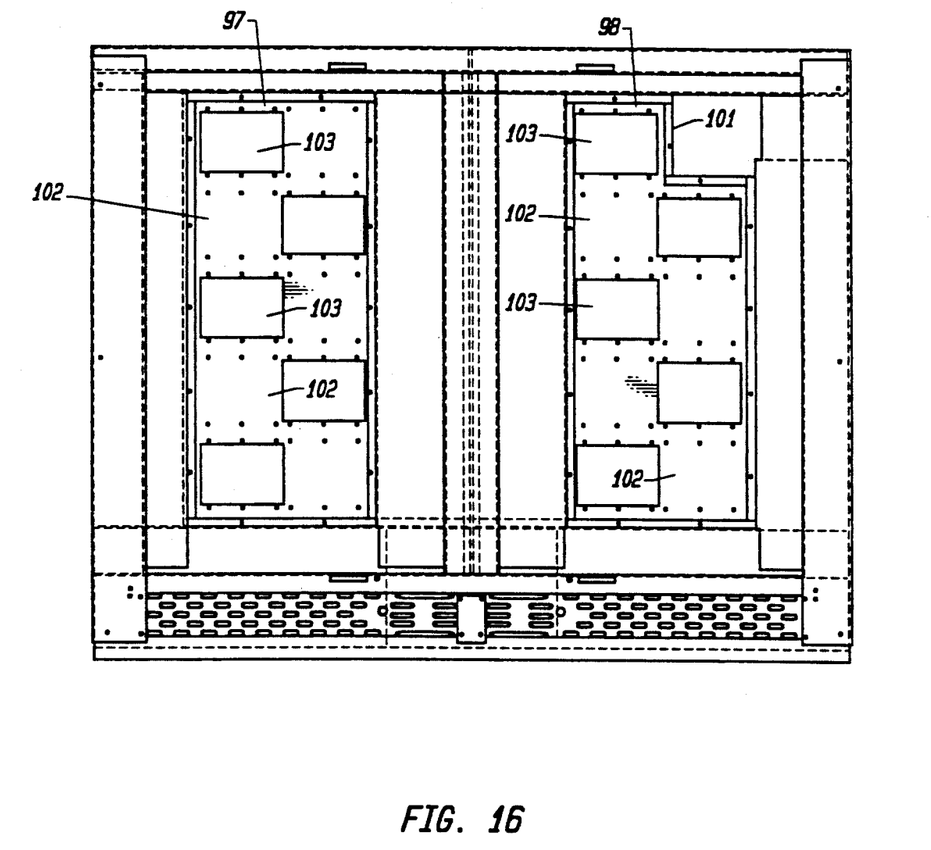
FIG. 16 is a left side elevational view illustrating two more back plates in the embodiment of FIG. 15.

The embodiment of FIGS. 15 and 16 is a two-sided system two sections on one of the two sides. On the side with a single section, the system has a back plate 96 with five rows of 6½ cell positions per row, with the exception of the upper row which has only 5½ cells. On the other side, the system has a pair of back plates 97,98 with five rows of two cell positions per row, except for the top row of plate 98 which has only one cell position. Plate 96 is mounted back-to-back in spaced parallel relationship with plates 97,98. The upper left corner 99 of plate 96 and the upper right corner 101 of plate 98 are cut away to provide room for a "mail box" (not shown) for transferring cartridges into and out of the system.

Each of the back plates has a plurality of data cell positions 102 and drive cell positions 103 arranged in a checkerboard pattern, with a column of half width data cell positions 104 in the center of plate 96. The arrangement of the cell positions on the two sides of the machine is such that the data cell positions on each plate are aligned with the drive cell positions on the other. With this arrangement, the drives which extend through the openings in the two plates are interleaved with each other between the plates, and this makes it possible to position the plates closer together than would be possible if the drives were directly opposite each other. The data cells and drive cells employed in this system are identical to the cells employed in the other embodiments, and the back plates are also similar except for the arrangement of the cell positions.

Separate picker assemblies are provided for transporting the cartridges within the three sections in the system of FIGS. 15-16. A single picker assembly can be provided for each section as in the embodiment of FIG. 1, or a separate picker can be provided for each row in a section as in the embodiment of FIG. 14.

In addition to placing two or more sections back-to-back as in the embodiment of FIGS. 15-16, two or more sections can also be stacked vertically, and an elevator (not shown) can be provided for transferring cartridges between the stacked sections.

The invention has a number of important features and advantages. The optical disks provide a large amount of storage in a relatively small space, and the modular construction makes it possible to build systems having any desired number of cartridges, drives and other devices. Interchangeable parts are used throughout, with the exception of the back plates which have different mounting positions for different sizes of systems.

It is apparent from the foregoing that a new and improved data storage and retrieval system has been provided. While only certain presently preferred embodiments have been described in detail, as will be apparent to those familiar with the art, certain changes and modifications can be made without departing from the scope of the invention as defined by the following claims.

We claim:

1. A modular system for the storage and retrieval of data recorded on cartridges, comprising a first type of cell for holding a plurality of cartridges, a second type of cell for holding a device for transcribing data on the cartridges, a generally planar back plate having a front surface with a plurality of mounting positions for receiving at least one cell of the first type and one cell of the second type, said first and second types of cells being of similar size and shape and being interchangeable between different ones of the mounting positions, registration means carried by the back plate and rear portions of the cells for aligning either type of cell in a predetermined fixed position in each of the mounting positions, and fasteners arranged in a similar pattern on each of the cells for securing the cells to the back plate with the rear portions of the cells adjacent to the front surface of the back plate and the cells projecting in a forward direction from the back plate and being supported solely by the back plate and the fasteners.

2. The system of claim 1 wherein all of the mounting positions are adapted to receive cells of the first type and at least one of the mounting positions is adapted to receive a cell of either type.

3. The system of claim 2 wherein all of the mounting positions are adapted to receive a cell of either type includes an opening in the back plate through which a device carried by a cell of the second type can extend.

4. The system of claim 1 wherein the registration means includes a pair of dowel pins projecting from the front surface of the back plate at each of the mounting positions and a pair of sockets in the rear portion of each of the cells for receiving the dowel pins.

5. The system of claim 1 wherein the cells of the first type are fabricated of molded plastic and have resilient plastic fingers formed as an integral part thereof for frictional engagement with edge portions of the cartridges to retain the cartridges in the cells.

6. The system of claim 1 wherein each of the cells is symmetrical and can be oriented in one of two predetermined positions on the back plate.

7. A modular system for the storage and retrieval of data recorded on cartridge in an optically readable form, comprising a plurality of data cells having slots for holding a plurality of cartridge, at least one drive cell having an optical drive mounted therein for transcribing data on the cartridges, said data cells and said drive cell all being of generally the same size and shape, a generally planar back plate having a plurality of mounting positions in which data cells can be mounted and at least one mounting position in which either a data cell or a drive cell can be mounted, a pair of registration pins projecting from the front surface of the back plate at each of the mounting positions, sockets in the rear portions of the cells for receiving the registration pins to align the cells in a predetermined position on the back plate at each of the mounting positions, fasteners arranged in a similar pattern on each of the cells for mounting the cells on the back plate in respective ones of the mounting positions with rear portions of the cells adjacent to the front surface of the back plate and the cells projecting in a forward direction from the back plate and being supported solely by the back plate and the fasteners, and means for transporting cartridges between selected ones of the cells.

8. The system of claim 7 wherein each of the positions in which either a data cell or a drive cell can be mounted includes an opening in the back plate through which a drive carried by a drive cell can extend.

9. The system of claim 7 wherein the data cells are fabricated of plastic and have resilient plastic fingers formed as an integral part thereof for frictional engagement with edge portions of the cartridges to retain the cartridges in the cells.

10. The system of claim 7 wherein each of the cells is symmetrical and can be oriented in one of two predetermined positions in one of the mounting positions on the back plate.

11. The system of claim 7 including an additional drive cell mounted in a position where either a data cell or a drive cell can be mounted.

12. The system of claim 7 wherein the cells are arranged in a rows with at least one data cell and one drive cell in each row, and the means for transporting cartridges between the cells includes a separate carriage movable between the cells in each row, and means carried by the carriages for moving selected ones of the cartridges into and out of the cells.

13. A modular system for the storage and retrieval of data recorded on cartridges in an optically readable form, comprising a plurality of data cells for holding a plurality of the cartridges, at least two drive cells having optical drives mounted therein for transcribing data on the cartridges, said data cells and said drive cells all being of generally the same size and shape, a pair of generally planar back plates positioned back-to-back in parallel spaced relationship, each of said back plates having a front surface with a plurality of first mounting positions in which either data cells or drive cells can be mounted and a plurality of second mounting positions in which drive cells can be mounted with rear portions of the cells in both of said mounting positions adjacent to the front surfaces of the plates and the cells on the two plates projecting in opposite directions from the front surfaces of the two plates, the first mounting positions including openings through which drives carried by cells mounted in those positions can extend, the first mounting positions in the two back plates being displaced laterally from the each other, means mounting at least one of the data cells and one of the drive cells on each of the back plates, with the drives mounted on the two plates extending through the openings and being interleaved with each other between the plates, and means for transporting cartridges between selected ones of the cells mounted on each of the back plates.

14. The system of claim 13 wherein the first and second mounting positions are arranged in a checkerboard pattern on each of the back plates.

15. The system of claim 13 wherein the cells are arranged in rows on the two back plates, and the means for transporting cartridges includes a bridge positioned in front of the cells on each of the back plates for movement in a direction perpendicular to the rows, a carriage mounted on each of the bridges for movement in a direction parallel to the rows, and means mounted on each of the carriages for moving the cartridges into and out of the cells.

16. The system of claim 15 wherein one of the back plates has two sections, with a separate bridge, carriage and cartridge moving means being provided for each of the two sections.

17. The system of claim 3 wherein the cells on the two back plates are arranged in rows, and the means for transporting cartridges includes a plurality of carriages adapted for movement along the rows, with a separate carriage being provided for each of the rows, and means carried by the carriages for moving selected ones of the cartridges into and out of the cells.

18. The system of claim 13 including a pair of registration pins projecting from the front surfaces of the back plates at each of the mounting positions, and sockets in the rear portions of the cells for receiving the registration pins to align each of the cells in a predetermined position.

19. The system of claim 13 wherein each of the cells is symmetrical and can be oriented in one of two predetermined positions in one of the mounting positions on the back plates.

20. The system of claim 13 including an additional drive cell mounted in one of the first mounting positions.

21. A modular system for the storage and retrieval of data recorded on cartridges in an optically readable form, comprising a plurality of data cells for holding a plurality of the cartridges, at least two drive cells having optical drives mounted therein for transcribing data on the cartridges, said data cells and said drive cells all being of generally the same size and shape, a pair of generally planar back plates positioned back-to-back in parallel spaced relationship and having front surfaces with a plurality of first and second mounting positions arranged in a checker-board pattern, with the first mounting positions on one of the plates being aligned with the second mounting positions on the other plate, each of said first mounting positions being adapted to receive either a data cell or a drive cell and including a hole in the plate through which a drive can extend, each of second mounting a plurality of the data cells and a plurality of the drive cells on each of the back plates, with the cells projecting in a forward direction from each of the plates and the drives mounted on the two plates extending through the openings and being interleaved with each other between the plates, and means for transporting cartridges between selected ones of the cells on each of the back plates.

22. The system of claim 21 wherein the means for transporting cartridges includes a bridge positioned in front of the cells on each of the back plates for movement in a first direction, a carriage mounted on each of the bridges for movement in a second direction, and means mounted on each of the carriages for moving the cartridges into and out of the cells.

23. The system of claim 22 wherein one of the back plates has two sections, with a separate bridge, carriage and cartridge moving means being provided for each of the two sections.

24. The system of claim 21 the means for transporting cartridges includes a plurality of carriages adapted for movement along rows of cells in the checkerboard pattern, with a separate carriage being provided for each of the rows, and means carried by the carriages for moving selected ones of the cartridges into and out of the cells.

25. The system of claim 21 including a pair of registration pins projecting from the front surfaces of the back plates at each of the mounting positions, and sockets positioned toward the rear of the cells for receiving the pins to align the cells in a predetermined position on the back plates.

26. The system of claim 21 wherein each of the cells is symmetrical and can be oriented in one of two predetermined positions in one of the mounting positions on the back plates.

27. The system of claim 21 including an additional drive cell mounted in one of the first mounting positions.

28. A modular system for the storage and retrieval of data recorded on cartridges, comprising a generally planar back plate having a front surface with pairs of registration pins projecting therefrom in a predetermined pattern at each of a plurality of predetermined mounting positions, a plurality of cells each having a rear wall with a plurality of sockets arranged in the predetermined pattern from receiving the registration pins to align the cells in the predetermined mounting positions, a plurality of data cartridges in one of the cells, a device for transcribing data on the cartridge in another one of the cells, and means for mounting the cells on the back plate with the rear walls of the cells in engagement with the front surface of the back plate and the cells projecting in a forward direction from the plate, the cells being fully interchangeable between different ones of the mounting positions on the back plate.

* * * * *